US011206761B2

(12) United States Patent
Meeks et al.

(10) Patent No.: US 11,206,761 B2
(45) Date of Patent: Dec. 28, 2021

(54) LAWN MOWER ROPE GUIDE

(71) Applicant: Honda Motor Co., Ltd., Tokyo (JP)

(72) Inventors: Christopher D Meeks, Greensboro, NC (US); Scott J Kaskawitz, Hillsborough, NC (US)

(73) Assignee: Honda Motor Co., Ltd., Tokyo (JP)

(*) Notice: Subject to any disclaimer, the term of this patent is extended or adjusted under 35 U.S.C. 154(b) by 212 days.

(21) Appl. No.: 16/751,626

(22) Filed: Jan. 24, 2020

(65) Prior Publication Data
US 2021/0227747 A1 Jul. 29, 2021

(51) Int. Cl.
A01D 34/82 (2006.01)
A01D 34/68 (2006.01)
A01D 101/00 (2006.01)

(52) U.S. Cl.
CPC ....... A01D 34/822 (2013.01); A01D 34/6818 (2013.01); A01D 34/824 (2013.01); A01D 34/68 (2013.01); A01D 2101/00 (2013.01)

(58) Field of Classification Search
CPC ........ A01D 2101/00; A01D 2034/6843; A01D 34/824; A01D 34/6806; A01D 34/69; A01D 34/78
See application file for complete search history.

(56) References Cited

U.S. PATENT DOCUMENTS

| 2,721,711 | A | | 10/1955 | Ludwig | |
|---|---|---|---|---|---|
| 4,109,538 | A | | 8/1978 | Glenday et al. | |
| 4,433,530 | A | * | 2/1984 | Schaefer | A01D 34/6806 123/185.3 |
| 4,458,472 | A | | 7/1984 | Christopherson | |
| 4,958,483 | A | * | 9/1990 | Heismann | A01D 34/6818 123/185.2 |
| 5,033,258 | A | | 7/1991 | Morse | |
| 5,088,273 | A | | 2/1992 | Braun et al. | |
| 7,240,473 | B2 | * | 7/2007 | Docken | A01D 34/6818 242/404.3 |

(Continued)

OTHER PUBLICATIONS

"Husqvarna 917.375940 Lawn Mower—Rope Guide 5321885-01". Ebay.com https://www.ebay.co.uk/p/Husqvarna-917-375940-Lawn-Mower-Rope-Guide-5321885-01/845360003.

(Continued)

*Primary Examiner* — Abigail A Risic

(74) *Attorney, Agent, or Firm* — American Honda Motor Co., Inc.; Gregory J Burke

(57) ABSTRACT

A starter system for a lawn mower includes a handle tube and a rope guide. The rope guide includes a rod member with three bends defining four rod segments. A first rod segment extends linearly through opposite openings in the tube, a second rod segment is curved at a diameter approximating a tube surface diameter, a third rod segment extends longitudinally along the tube, and a fourth segment extends to a distal coil. Two points of direct contact between the rod member and the tube outer surface include a first contact point on the second rod segment adjacent a tube opening indentation and a second contact point on the third rod segment near the third bend. The rod segments are configured such that tightening of a nut member dynamically deflects the second and third rod segments to increase a gap with the tube outer surface.

20 Claims, 6 Drawing Sheets

(56) References Cited

U.S. PATENT DOCUMENTS 7,370,623 B1    5/2008  Solinski et al.

OTHER PUBLICATIONS

"Craftsman Lawn Mower Model #91737606-ROPE GUIDE-Part# 586122501". https://www.ebay.com/itm/Craftsman-Lawn-Mower-Model-91737606-ROPE-GUIDE-Part-586122501-FREE-Shipping-/332874943242.

"Toro Recoil Start Rope Guide" MowersDirect.com https://www.mowersdirect.com/Toro-86-9671P/p4093.html.

* cited by examiner

LAWN MOWER ROPE GUIDE

BACKGROUND

Lawn mowers commonly include an internal combustion engine and a starter system for an operator to start the engine. For a manual start mower, the starter system includes a starter rope windingly received on a recoil reel for rotating an interconnected starter pulley and engine crankshaft when the rope is pulled. For walk-behind lawn mowers, a safety feature includes a starter control bar pivotally supported on a mower handle extending upwardly from a wheeled deck. In order to maintain the engine ignition in an engaged (ON) state, the operator must hold the control bar in a rotated condition against the mower handle. To facilitate the necessary holding of the control bar and simultaneous application of pulling force to the starter rope, walk-behind mowers typically include a rope guide on the mower handle to receive and position the starter rope in a convenient location.

A prior art rope guide 10 is shown in FIG. 1 mounted to a tubular portion of a mower handle 11. Rope guides typically include a metal wire or rod member formed to include a proximal end portion 12 with a threaded region 14. The rod member is received through opposite handle tube openings (not seen) and secured to the handle tube by a nut member 18. The rope guide includes a loop or coil 26 formed at a distal end of the rope guide opposite the threaded region. The loop or coil facilitates sliding receipt of a starter rope by the rope guide. The loop or coil also provides a stop surface (or region) for contact with a handgrip of the manual starter system to retain the handgrip at the rope guide location against the recoil force of the winding reel. The threaded end portion 14 can be arranged to extend horizontally through the handle tube, as shown in FIG. 1 or, alternatively, can extend vertically.

To develop clamping forces upon tightening rotation of the nut member 18, rope guides typically include an integrated flange member 16 extending from the rod in an outward radial direction (i.e., in the manner of a fixed washer). The flange member 16 is arranged in the proximal end portion 12 to contact a handle surface immediately adjacent the opening on the non-fastener side of the handle tube (i.e., the side opposite the nut member 18). Rope guides also sometimes include a separate washer (not shown) received on the rope guide under the nut member 18 to distribute clamping force to a larger surface area on the fastener side of the handle.

The prior rope guide 10 is formed in the proximal end portion 12 to include a U-shaped portion 20 configured to extend the rope guide away from the handle at the integrated flange 16 and then return it towards the handle. The U-shaped portion is connected to a longitudinally-extending portion 22 extending along a length of the handle tube 11. An upwardly-extending portion 24 of the rope guide extends to the coil 26. The upwardly-extending portion 24 distances the coil 26 from the mower handle for convenience. Such distancing of the coil, however, increases a moment arm associated with forces applied to the rope guide by the rope and handgrip. These forces can generate torque load acting about the axis of the nut member 18 sufficiently large to overcome the clamping forces, which can be generated on the relatively small tube surface areas adjacent the fixed flange 16 and the nut member 18.

The inclusion of the longitudinally-extending portion 22 functions to limit rotation of the rope guide 10 about the axis of the end portion including threaded portion 14. The longitudinal portion 22, however, can only limit the relative rotation and cannot prevent the above-described overcoming of the clamping forces by sufficiently large torque loads applied at the coil 26. Once the nut clamping forces are overcome, the prior rope guide is free to oscillate in a rattling or wobbling manner within the limited rotational range established by the longitudinal-extending portion 22.

What is needed is a rope guide configured to generate an enhanced securing engagement between the rope guide and a handle tube for increased resistance to unloosening of the rope guide connection provided by the nut member by loading at the distally-located coil portion.

BRIEF DESCRIPTION

According to one aspect, a manual starter system for a lawn mower having an internal combustion engine includes a starter rope, a mower handle, and a rope guide for receiving and guiding the starter rope. The handle includes a tube defining a fastener side opening and a non-fastener side opening at a mounting location for the rope guide. The rope guide includes a rod member formed in a proximal end portion to include at least one bend segment, which includes a first bend segment defining first and second rod segments. The first rod segment includes a threaded portion for receipt of a nut member adjacent the fastener side opening and extends substantially linearly between the handle tube openings. The second rod segment is configured to establish a first point of direct contact between the rod member and an exterior surface of the handle tube, the first contact point located adjacent the first bend location of the rod member and adjacent the non-fastener side opening of the handle tube.

According to one embodiment, the first bend location can define a bend angle that is an acute angle. The proximal end portion can include a third rod segment defining a second point of direct contact between the rod member and the tube exterior surface. The second rod segment can be curved in substantially circular manner at a diameter approximately equal to an exterior surface diameter of the handle tube and the third rod segment can extend substantially longitudinally with respect to the handle tube. The rod segments can be configured such that a tightening of the nut member from a partially-secured condition of the rope guide towards a fully-tightened condition dynamically loads the proximal end portion resulting in a deflection of the second and third segments and increasing a gap. The fourth rod segment can extend obliquely from the handle tube.

According to another aspect, a manual starter system for a lawn mower includes a handle tube with opposite openings and a rope guide received through the handle tube openings. The rope guide includes a rod member having three bend locations defining four rod segments. The bend locations define first and second points of direct contact between the rod member and an outer surface of the tube. The first contact point is located on the second rod segment adjacent one of the tube openings and the second contact point is located on the third rod segment adjacent the third bend location. The rod member is substantially out of contact with the handle tube between the two contact points.

According to one embodiment, the first rod segment includes a threaded portion receiving a nut member and the second segment is curved in substantially circular manner at a diameter approximating an outer surface diameter of the tube. The rope guide can be configured such that a tightening of the nut member from a partially-secured condition for the rope guide towards a fully-tightened condition deflects the second and third rod segments such that a gap with the handle tube is increased.

According to another aspect, a rope guide for a lawn mower starter system includes a threaded area on a rod member receiving a nut member in a proximal end portion. The rope guide includes first, second and third bends in the rod member defining first, second, third, and fourth rod segments. The first bend includes an acute angle between the first and second rod segments. The first segment includes the threaded area, the second rod segment curves in substantially continuous manner and the third rod segment extends substantially longitudinally with respect to the handle tube. The rod member contacts an outer surface of the handle tube at a first contact point located on the second rod segment adjacent one of the handle openings and at a second contact point located on the third rod segment adjacent the third bend. The rope guide is substantially out of contact with the tube outer surface between the first and second contact points.

According to one embodiment, the proximal end portion of the rope guide can be configured such that a tightening of the nut member from a partially-secured condition of the rope guide towards a fully-tightened condition dynamically loads the rod member to deflect the second and third rod segments such that a gap with the handle tube along the second and third rod segments is increased.

DETAILED DESCRIPTION

Figure 2:
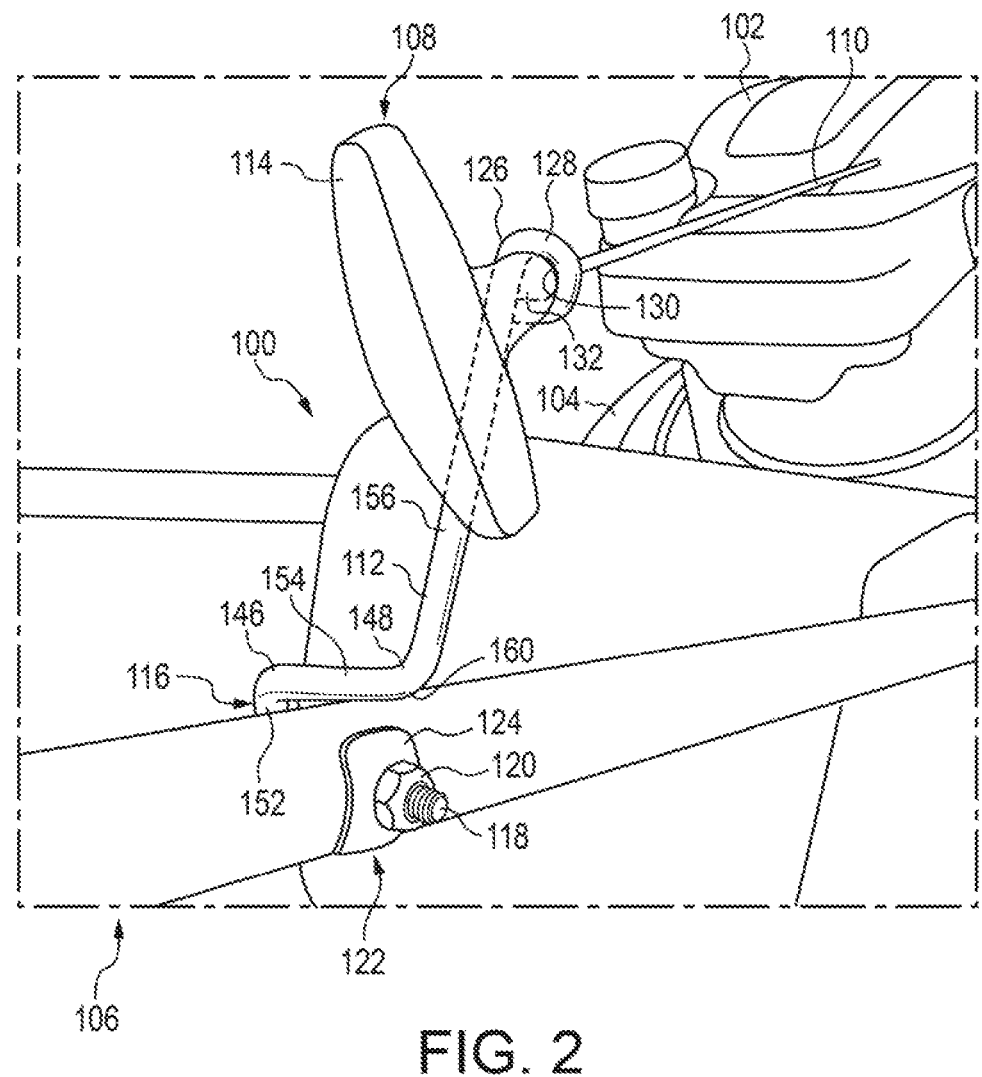
FIG. 2 is a perspective view of a walk-behind lawn mower having a manual starter system with a rope guide according to an exemplary embodiment of the present disclosure.

It should be understood that the description and drawings herein are merely illustrative and that various modifications and changes can be made without departing from the present disclosure. Referring now to the drawings, wherein like numerals refer to like parts throughout the several views, FIG. 2 shows a walk-behind lawn mower 100 including an internal combustion engine 102 mounted on a deck 104 and a mower handle 106 extending upwardly from a rearward end of the deck (i.e., for grasping engagement by an operator to propel and control the mower). The walk-behind mower has a manual starter system 108, which includes a starter rope 110 received by a rope guide 112 according to an exemplary embodiment.

As should be understood by those skilled in the art, the starter rope 110 of the manual starter system 108 is windingly received on a winding reel (not seen) for rotation of an interconnected pulley and engine crankshaft of the mower when a sufficient pulling force is applied to the starter rope 110 to begin the ignition process. The manual starter system 108 also includes a handgrip 114 secured to an end of the starter rope 110 to facilitate grasping engagement by an operator.

The exemplary rope guide 112 includes a proximal end portion 116 with a threaded portion 118 received by the mower handle 106 at a mounting location 122 and secured to the mower handle 106 by a nut member 120. The exemplary rope guide 112 can include a rod member. The rod member can be made from a metal material such as steel or aluminum, for example. The depicted starter system 108 also includes a plate member (or washer) 124 separately received onto the threaded portion 118 between the nut member 120 and the mower handle 106 (i.e., for spreading load under the nut member). As shown in FIG. 2, the mounting location 122 is selected to position the rope guide 112 at a distance from the engine such that the handgrip 114 and starter rope 110 are retained at an intermediate location along the mower handle 106. This intermediate location along the mower handle 106 facilitates grasping of the handgrip 114 by an operator with one hand while the operator simultaneously holds a safety control bar (not shown) against the mower handle with the other hand.

As will be described in greater detail below, the proximal end portion 116 of the exemplary rope guide 112, unlike prior rope guide 10, does not include a fixed (integrated) flange member on the rod member (see fixed flange member 16 in FIG. 1) contacting the mower handle on the non-fastener side of the handle opposite the nut member. The proximal end portion 116 of the rope guide 112 includes a series of bend locations defining multiple rod segments. One of the rod segments is curved in substantially circular manner of approximately equal diameter to an outer diameter of the mower handle 106. As will also be described, the configuration of the proximal rod segments coupled with the elimination of the fixed flange provides for an enhanced and dynamic clamping engagement between the rod segments of the rope guide and the mower handle for increased resistance to unloosening of the secured connection by starter rope loading.

As should be understood, the prior art construction limits the clamping forces capable of being generated by the nut member 12 to compressive forces created on limited tube surface areas adjacent the nut member 12 and the fixed flange 16. Such loading of the prior rope guide 10 by nut member 12 is, therefore, predominately a limited, largely static, loading confined to a terminal end portion of the rope guide extending between the handle tube openings. In contrast, the lack of fixed flange and the configuration of the rope guide 112 results in nut member loading being transmitted into the entire proximal end portion 116 including multiple rod segments. As will also be described, the distributed clamping forces involving multiple rod segments in the exemplary rope guide 112 are dynamic in nature in that the nut tightening stresses the rod segments resulting in deflection in the proximal end portion 116.

As shown in FIG. 2, the rope guide is formed at a distal end portion 126 to include a loop 128. The loop 128 provides for receipt (and sliding guidance) of the starter rope 110 to facilitate the application of a pulling force to the handgrip 114. The loop 128 also functions to provide a stop surface (or region) 130, which is contacted by the handgrip 114 at a connected end portion 132 of the handgrip where the starter rope 110 is secured. As should be understood, such stopping function by this portion of the rope guide 112 retains the handgrip 114 at the convenient rope guide mounting location 122 against the return (recoil) force of the winding reel (e.g., following a release of the handgrip by the operator).

Figure 3:
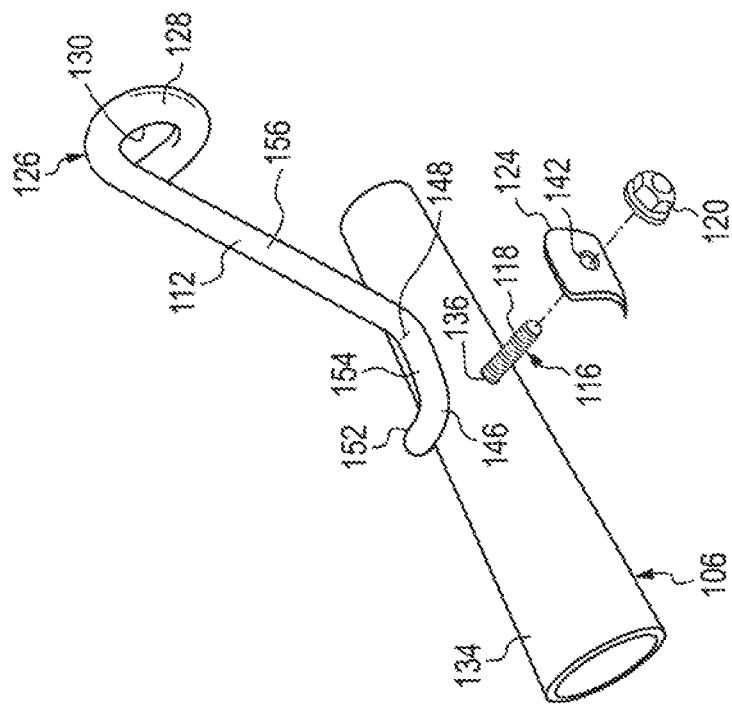
FIG. 3 is a perspective view of the rope guide of FIG. 2 and an adjacent tubular part of a handle, which is shown removed from the lawn mower for clarity of view, the rope guide being shown with a nut member and a plate member in an exploded condition from a fastener side of the handle tube.
Figure 4:
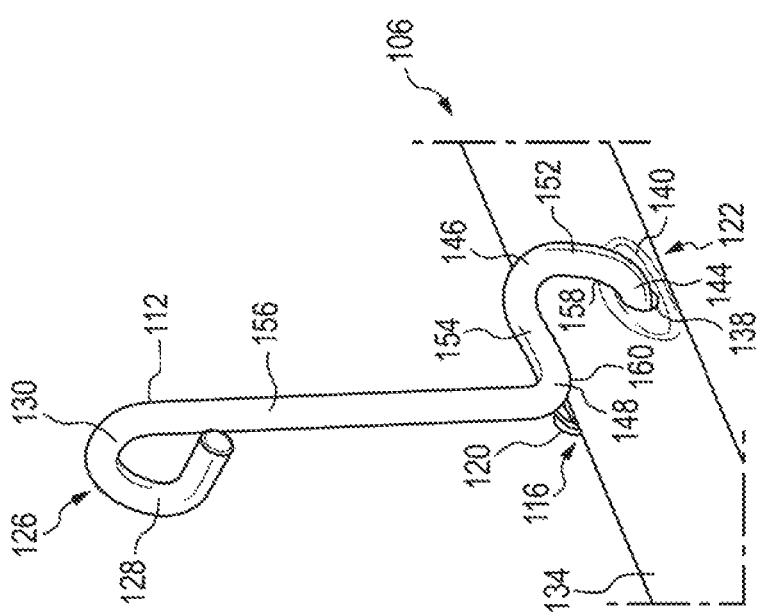
FIG. 4 is a perspective view of the rope guide and handle tube of FIG. 3 shown from a non-fastener side opposite the fastener side view shown in FIG. 3.
Figure 5:
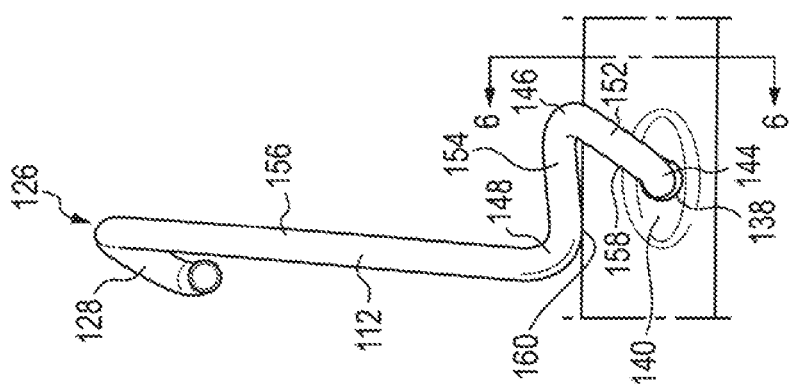
FIG. 5 is a side view of the rope guide and handle tube of FIG. 4 viewed from the non-fastener side.
Figure 6:
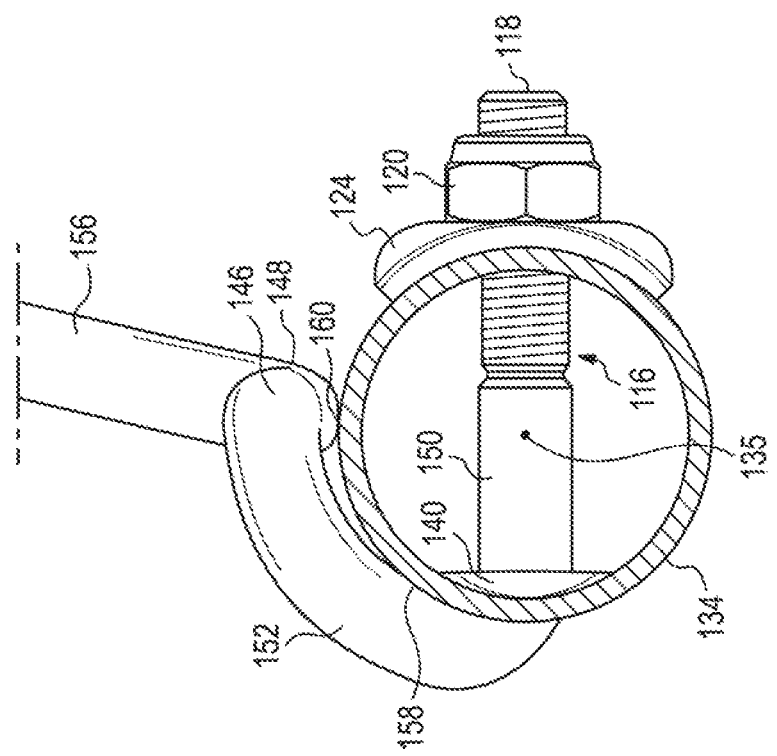
FIG. 6 is a section view of the rope guide and handle tube of FIG. 5 taken along lines 6-6 in FIG. 5.

Referring now to FIGS. 3-6, the rope guide 112 is shown removed from the lawn mower 100 with a tubular portion 134 of the mower handle 106 for clarity of view. The tubular portion 134 may hereinafter also be referred to as "the handle tube". The rope guide 112 is shown in FIG. 3 with the nut member 120 and the plate member 124 in an exploded condition from a fastener side of the handle tube 134. In FIGS. 4 and 5, the rope guide 112 and handle tube 134 are shown from an opposite non-fastener side of the handle tube from the fastener side view shown in FIG. 3. FIG. 6 illustrates a sectional view taken along the lines 6-6 in FIG. 5.

As shown in the various views, the handle tube 134 includes aligned openings 136, 138 respectively defined on the fastener side and non-fastener side of the handle tube. The openings 136, 138 are sized and arranged for receipt of the proximal end portion 116 of rope guide 112 including threaded portion 118 (i.e., in a horizontal direction through the handle tube as shown in FIG. 6) such that the threaded portion extends from the tube to receive nut member 120. The mower handle 106 includes a tube indentation 140 at the location at which the opening 138 in the non-fastener side of the handle is defined (see FIGS. 4-6). As can be seen in FIG. 3, however, there is no corresponding indentation for opening 136 on the fastener side of the mower handle 106. As also seen in FIG. 3, the plate member 124 includes an opening 142 configured for receipt of the threaded portion 118 extending from the aligned openings 136, 138.

The bend locations in the proximal end portion 116 of the depicted rope guide 112 include first, second and third bend locations 144, 146, 148. The bend locations respectively define first, second, third and fourth rod segments 150, 152, 154, 156 leading from the threaded portion 118 to the loop 128. The proximal end portion 116 of the rope guide 112, which provides the enhanced engagement between the rope guide 112 and the mower handle 106, includes the first, second and third rod segments 150, 152 and 154. As shown, the fourth rod segment 156 extends from the proximal end portion 116 at the handle tube 134 towards a loop 128 formed at the distal end 126 of rope guide 112.

As seen in FIG. 6, the first rod segment 150 includes the threaded portion 118 and an adjacent non-threaded portion extending in an axially aligned (linear) manner from the threaded portion 118 towards the opening 138 and indentation 140 on the non-fastener side of the handle tube 134. From the point of view shown in FIG. 6, the first rod segment 150 extends substantially horizontally through the handle tube 134. The first bend location 144 (see FIGS. 4 and 5), which defines the first and second rod segments 150, 152, is arranged on the rope guide 112 such that the transition between the rod segments 150, 152 in the mounted condition is positioned immediately adjacent the opening 138 and the indentation 140. Arranged in this manner, at least part of the transition from the first rod segment 150 to the second rod segment 152 is located within the indentation 140.

The first bend location 144 includes a bend in the rope guide rod (i.e., the rod is redirected transversely to a central axis of the rod). According to one embodiment, the bend at the first bend location 144 defines an acute angle between the rod segments 150, 152. The acute angle at the first bend location could be in a range between 60 and 90 degrees and, more particularly, could be in a range between 75 and 85 degrees. The transition between the rod segments 150, 152 at the first bend location 144 also orients the rope guide rod such that the second rod segment 152 extends obliquely along the handle tube 134 with respect to a longitudinal axis 135 of the tube (see FIG. 5). According to one embodiment this oblique angle with respect to the tube axis 135 could be in a range between 30 and 60 degrees and, more particularly, in a range between 45-55 degrees.

Figure 7:
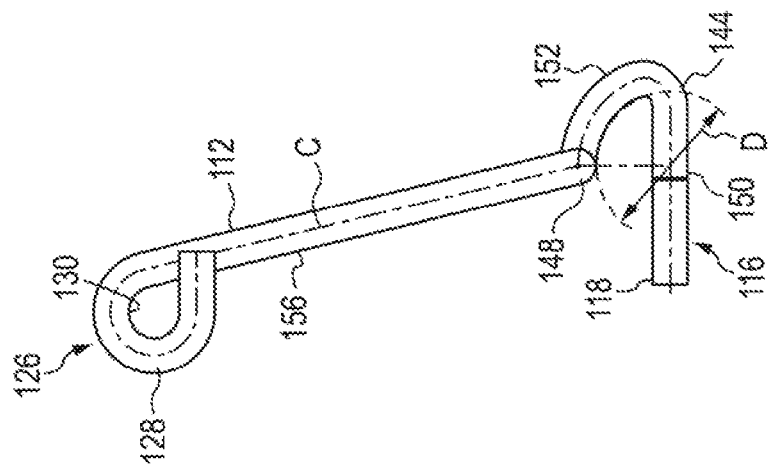
FIG. 7 is a first side view of the rope guide of FIGS. 2-6.
Figure 8:
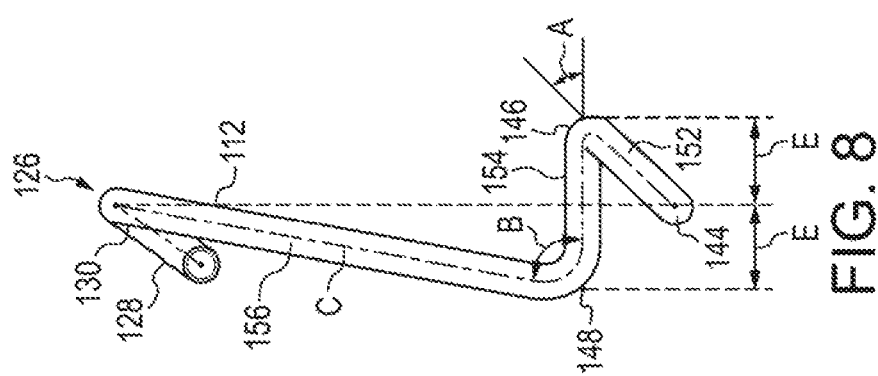
FIG. 8 is a second side view of the rope guide of FIG. 7 rotated 90 degrees about a vertical axis in a clockwise direction from the view shown in FIG. 7.

Referring to FIGS. 7 and 8, which are side views showing the rope guide 112 separately from the handle tube 134, the geometry of the rope guide 112 will be described in more detail. As seen in FIG. 7, the second rod segment 152 does not extend linearly from the first bend location 144. Instead, the second rod segment 152 is curved in a substantially continuous manner along its length. As shown, the second rod segment 152 is curved such that the second rod segment describes a substantially circular path when the rope guide is viewed from the side view of FIG. 7. The second rod segment 152 will, therefore, also sometimes hereinafter be referred to as the "curved rod segment" or the "circular rod segment". As shown, the circular arc segment described by the second rod segment 152 along an interior side of the rod segment (i.e., the side that will be closest to the handle tube 134 in its mounted condition) has a diameter D. According to one embodiment, the diameter D associated with the circular curved rod segment 152 can be selected to be substantially equal to, but slightly larger than, the outer diameter of handle tube 134 of mower handle 106. The ratio between the diameter D along the interior side of the curved rod segment 152 and an outer diameter of handle tube 134 can be in a range between 1.0 and 1.1 and, more particularly, between a range of 1.02 and 1.06.

The configuration of the first and second rod segments 150, 152 together with the configuration of the handle tube 134 provide for a first contact point (or location) 158 between the rod of the rope guide 112 and the outer surface of the tube. As shown, the first contact point 158 in the depicted embodiment occurs between the second rod segment 152 and the handle tube 134 near the indentation 140. As will be described further below, the circular curved nature of the second rod segment 152, which is curved along a circular arc segment at a diameter approximating an outer diameter of the handle tube 134, as well as the location of the first contact point 158 are additional features contributing to the enhanced, dynamic, securement between the rope guide 112 and the handle tube 134.

A rod centerline is illustrated by a broken line C in FIGS. 7 and 8. As can be understood from the centerline C in FIG. 7, the curvature of the rope guide 112 in the second rod segment 152 orients the rope guide rod towards the end of rod segment 152 adjacent the second bend location 146 in a plane that is substantially parallel to the first rod segment 150 (i.e., in a horizontal plane in the view shown in FIG. 7). As seen in FIGS. 3 and 6, the rope guide 112 is formed (i.e., bent) at the second bend location to redirect the third rod segment 154 such that it extends substantially longitudinally along the handle tube 134 (i.e., substantially horizontally in the view of FIGS. 6 and 7 and parallel to the tube central axis 135). The third rod segment 154, accordingly, will hereinafter sometimes be referred to as the "longitudinally-extending" or "longitudinal" rod segment.

The first, second and third rod segments 150, 152, 154 collectively form the proximal end portion 116 of the rope guide 112, which is configured to provide engagement between the rope guide 112 and the handle tube 134 with enhanced securement of the rope guide 112. As discussed above, the rod segments of the proximal end portion 116 directly contact an outer surface of the handle tube 134 at the first contact point 158 (i.e., adjacent the indentation 140). As seen in FIGS. 5 and 6, the rod segments of the proximal end portion 116 and the handle tube 134 are also configured to provide direct contact between the rod segments of the proximal end portion 116 and the outer tube surface at a second contact point 160. As seen in FIGS. 5 and 6, the second contact point 160 is located adjacent an end of the third rod segment 154 defined by the third bend location 148 (i.e., near an end of the proximal end portion 116 that is opposite the threaded portion 118). As will be described further below, the two points of direct contact 158, 160 between the rod segments of the proximal end portion 116 and the outer tube surface is another feature contributing to the enhanced securement of the rope guide 112 on the handle tube 134.

Referring again to FIGS. 7 and 8, the third bend location 148, which defines the transition between the third and fourth rod segments 154, 156, redirects the fourth rod segment 156 from the generally longitudinal orientation of the third rod segment 154 to a generally upward orientation from the point of view shown in the figures. The fourth rod segment 156 will, therefore, sometimes hereinafter be referred to as the "upwardly-extending" rod segment. As shown in FIGS. 7 and 8, however, the bend in the rope guide rod at the third bend location 148 need not result in orthogonality between the fourth rod segment 156 and the proximal end portion 116. Instead, as shown, the orientation of the fourth rod segment 156 can be oblique with respect to both the first rod segment 150 (see FIG. 7) and the third rod segment 154 (see FIG. 8). According to one embodiment, an oblique angle between the fourth rod segment 156 and the first rod segment 150 (see FIG. 7) can be in a range between 75 and 80 degrees and an oblique angle between the fourth rod segment 156 and the third rod segment 154 can be approximately 80 degrees (see angle B in FIG. 8). Referring still to FIG. 8, the oblique angle B between the fourth rod segment 156 and the third rod segment 154 can be selected such that an apex point defined by the centerline C in the loop 128 of distal end portion 126 is located equidistantly in a horizontal direction between opposite ends of the third rod segment 154. This is represented in FIG. 8 by the equal horizontal distances E extending in opposite directions from a vertical reference line passing through the apex point of centerline C. As also shown in FIG. 8, the oblique angle B between the third and fourth rod segments 154, 156 also horizontally aligns the apex point in loop 128 with the first rod segment 150 as indicated by the vertical reference line.

As depicted, the upwardly-extending rod segment 156 can be elongated to locate the rope-receiving loop 128 at a substantial distance from the proximal end portion 116 and the handle tube 134. Such distancing of loop 128 to a remote location from handle tube 134 facilitates convenient access to the handgrip 114 for application of the required pulling force by an operator. According to one embodiment, the distance between the central axis of threaded portion 118 and a center of loop 128 can be equal to approximately 3.5 to 4 times the outer diameter of handle tube 134. As discussed above, this distance represents a moment arm associated with a torque load acting about threaded portion 118 that would be created by a force applied to loop 128 (e.g., by the rope 110 or handgrip 114). As should also be understood, increase in this moment arm, increases the resulting torque load applied about the threaded portion 118 for a given force applied to the loop 128.

Figure 9A:
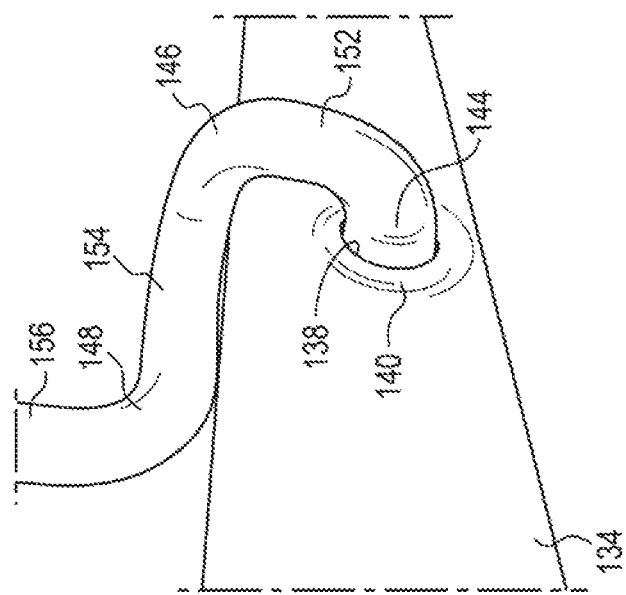
FIG. 9A is a perspective view of the rope guide and handle tube of FIGS. 2-6 shown in a partially-assembled condition prior to a full tightening of the nut member.
Figure 9B:
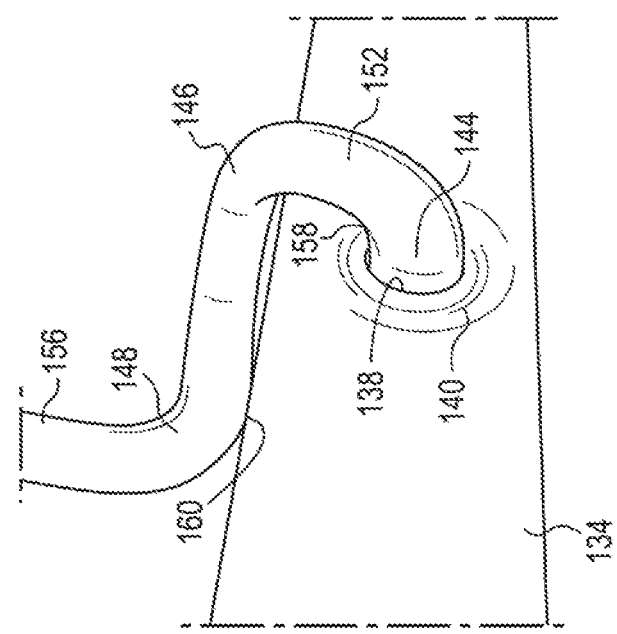
FIG. 9B is a perspective view of the rope guide and handle tube of FIGS. 2-6 shown in a fully-assembled condition after tightening of the nut member.

Referring to FIGS. 9A and 9B, the enhanced securement between the proximal end portion 116 of rope guide 112 and handle tube 134 provided by the above-described features will be described in further detail. FIG. 9A depicts the rope guide 112 mounted on the handle tube 134 in a partially-secured condition. This condition would result, for example, if the nut member 120 were received onto the threaded portion 118 and advanced on the threads of threaded portion 118 a sufficient distance to establish a continuing contact from the nut member 120 through the plate member 124 and from the plate member 124 to the outer surface of the handle tube 134 under the plate member. The nut member 120, however, is not sufficiently tightened to generate any loading transmitted into the rod segments 150, 152, 154 of the proximal end portion 116 in any significant amounts. In other words, the rope guide 112 in the partially-secured condition is positioned at the mounting location 122 in FIG. 9A but the rod segments 150, 152, 154 are not yet stressed by the tightening of the nut member 120.

As discussed above, the exemplary rope guide 112 does not include a fixed flange on the rod member. As such, when the nut member 120 is tightened beyond the partially-secured condition of FIG. 9A, the advancement of the nut member 120 along the threaded portion 118 will cause the proximal end portion 116 of rope guide 112 to be drawn more tightly against the handle tube 134. This drawing of the proximal end portion 116 will result in significant loading being transmitted into each of the rod segments 150, 152, and 154. The second rod segment 152, which is curved in circular fashion at a diameter closely approximating the outer diameter for handle tube 134 would, absent some other constraint, tend to seek conformance with the similarly shaped handle tube when it is loaded by the tightening of the nut member 120. As discussed above, however, the second rod segment 152 is also connected to the longitudinally-extending third rod segment 154 configured to establish the second contact point 160 with the outer surface of handle tube 134 adjacent the third bend location 148.

Referring to FIG. 9B, the tightening of the nut member 120 beyond the partially-secured condition of FIG. 9A has drawn the proximal end portion 116 against handle tube 134 and loaded each of rod segments 150, 152, 154. As shown in FIG. 9B, the loading transmitted into rod segments 150, 152, 154 by the nut tightening can be sufficiently large to cause a deflection of the second and third rod segments 152, 154. As seen by comparing FIGS. 9A and 9B, the deflection of rod segments 152, 154 by the nut member loading increases a gap between the second and third rod segments 152, 154 and the outer surface of handle tube 134. The increased gap for the rod segments 152, 154 of the rope guide in the fully-tightened condition of FIG. 9B is also seen in FIGS. 5 and 6. The deflection in the proximal end portion 116 occurring under loading applied from the partially-secured condition of FIG. 9A towards the fully-tightened condition of FIG. 9B can also be described as a rotation of the second and third rod segments 152, 154 about a central axis of first rod segment 150 when the mounted rope guide 112 is viewed from a side of the handle tube 134. For example, from the point of view of the side view shown in FIG. 5, such rotation of rod segments 152, 154 about the first rod segment axis would be in a counter-clockwise direction.

Figure 1:
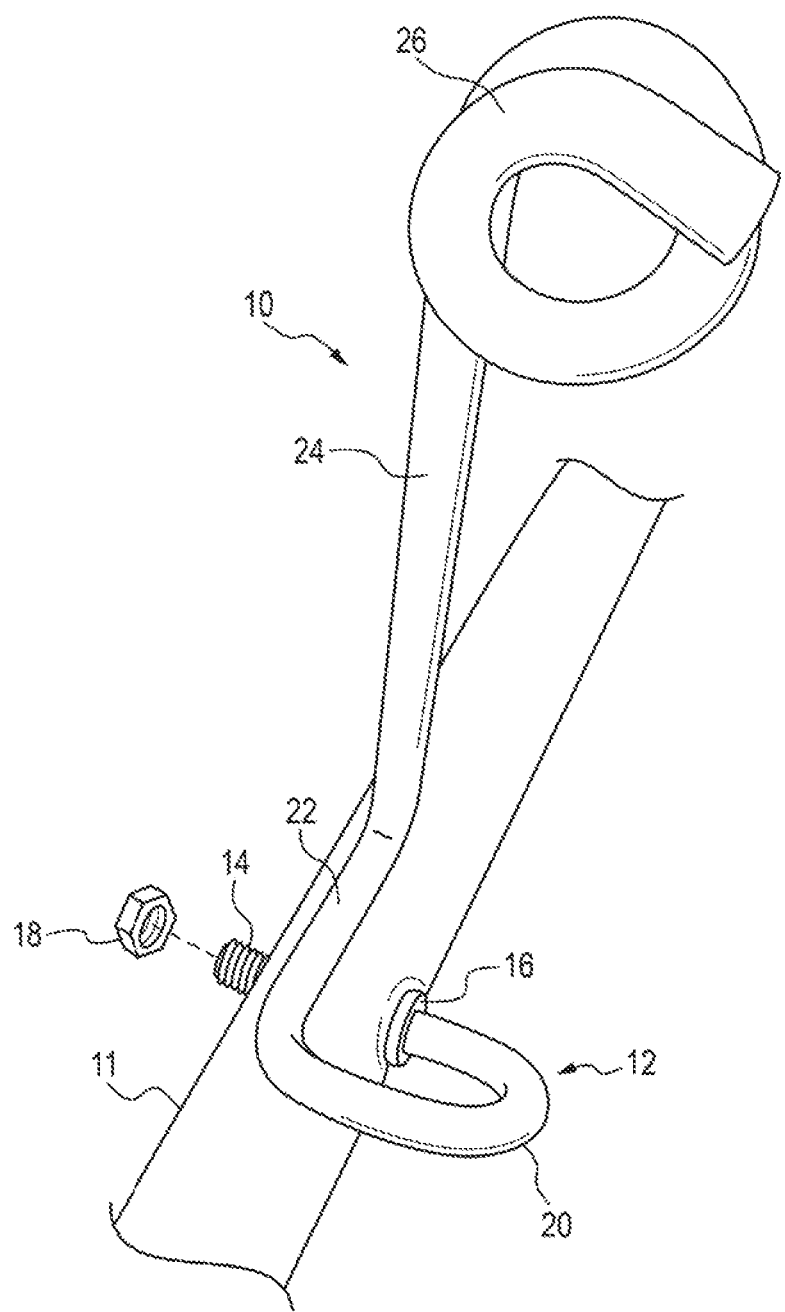
FIG. 1 is a perspective view of a prior art rope guide mounted to a lawn mower handle.

The deflection of the second and third rod segments 152, 154 under the loading applied by nut member 120, therefore, represents a more enhanced, dynamic, type of loading applied to the proximal end portion 116 of rope guide 112 in contrast to that provided in prior rope guides such as rope guide 10 of FIG. 1. As discussed above, the contact by the fixed (integrated) flange 16 of prior rope guide 10 adjacent the tube opening opposite nut member 18 limits the transmission of any nut-tightening loading to the rod segments of the rope guide to a terminal end portion extending linearly through the interior of the tube between the openings. As should be understood, the strain response in this portion of the rope guide, if any, to the applied nut member tightening would be limited to a slight elongation of the terminal end portion of the rod segment. Such engagement between the prior rope guide 10 and the tube on which it is mounted, therefore, could be described as a largely static, limited, type of engagement in contrast to the enhanced engagement provided for the exemplary rope guide 112.

As a result of the more dynamic engagement provided for the exemplary rope guide 112, in which nut loading member is transmitted into each of the rod segments 150, 152, 154 to a sufficient extent to deflect rod segments 150, 152 in rotation about rod segment 150, an enhanced securement of the rope guide 112 at the mounting location 122 is provided. As should be appreciated, such enhanced securement distributing the nut member loading to a much larger part of the rod member of rope guide 112 provides increased resistance of the secured condition against an unloosening of the nut member loading by loads applied to the loop 128 by the starter rope 110 and handgrip 114 of the starter system 108. This secured condition can be maintained even when the loop is highly remote from the handle tube, as shown for rope guide 112. In contrast, as discussed above, the interacting engagement between the prior rope guide 10 and the handle tube 11 is limited to clamping forces that can be generated between the fixed flange 16 and the tube 11 on one side and underneath the nut member 18 on the opposite side.

It should be understood that the rope guide according to the present disclosure could be modified from the exemplary rope guide 112 shown in the drawings and described above. For example, the rope guide is depicted with a single loop 128 at the distal end portion 126 but could be modified to include a multiple-loop coil instead. The dimensions could be varied such that, for example, the overall length for the fourth rod segment 156 is shortened or lengthened from that shown. As should be understood, such a change in the length of rod segment 156 would impact the moment arm for loading applied to the distal end portion 126 by the starter rope 110.

The rope guide could be reconfigured such that, for example, the fourth rod segment 156 could extend orthogonally with respect to the handle tube 134 instead of obliquely as depicted. The depicted rope guide is shown with a separate plate (washer) 124 received under the nut member. The washer is not required and could be eliminated. As described above, the depicted rope guide 112 includes an indentation 140, which is included only on one side of the handle tube 134 (i.e., on the non-fastener side). It is conceivable, however, that an indentation could be included on both sides of the handle tube.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A manual starter system for a lawn mower having an internal combustion engine, the starter system comprising:
    a starter rope for starting the internal combustion engine through an application of a pulling force to the rope;
    a mower handle including a tube defining a fastener side opening and an opposite non-fastener side opening at a mounting location; and
    a rope guide secured to the handle tube at the mounting location for receiving and guiding the starter rope,
    wherein the rope guide includes a rod member with a proximal end portion having at least one bend location defining a plurality of rod segments, the rod segments including a first rod segment extending substantially linearly through the handle tube between the openings, the first rod segment including a threaded portion for receiving a nut member adjacent the fastener side opening to secure the rope guide to the handle tube at the mounting location, the at least one bend location including a first bend location adjacent the non-fastener side opening defining a transition between the first rod segment and an adjacent second rod segment, the second rod segment configured to establish a first point of direct contact between the rod member and an exterior surface of the handle tube, the first contact point located adjacent the first bend location of the rod member and adjacent the non-fastener side opening.

2. The starter system of claim 1, wherein the second rod segment is curved substantially continuously throughout its length.

3. The starter system of claim 2, wherein the second rod segment is curved in a substantially circular manner at a diameter approximately equal to a diameter of the exterior surface of the handle tube.

4. The starter system of claim 2, wherein the proximal end portion of the rope guide includes a second bend location defining a transition between the second rod segment and an adjacent third rod segment, the third rod segment extending substantially longitudinally with respect to the handle tube, a second point of direct contact between the rod segments and the exterior surface of the handle tube being defined on the third rod segment, and wherein a tightening of the nut member from a partially-secured condition for the rope guide towards a fully-tightened condition deflects the second and third rod segments such that a gap between the rod segments and the handle tube is increased.

5. The starter system of claim 4, wherein the handle tube includes an indented portion in which the fastener side opening is located, the first contact point located adjacent the indented portion, the second contact point located on the third rod segment adjacent a third bend location defining a transition between the third rod segment and an adjacent fourth rod segment.

6. The starter system of claim 5, wherein the fourth rod segment extends to a coil located in a distal end portion of the rope guide.

7. The starter system of claim 6, wherein the fourth rod segment extends obliquely from the third bend location with respect to the handle tube when viewed from an end of the handle tube.

8. The starter system of claim 7, wherein the fourth rod segment also extends obliquely with respect to the handle tube when viewed from a side of the handle tube.

9. The starter system of claim 1, wherein the first bend location defines a bend angle between the first and second rod segments, and wherein the bend angle is an acute angle.

10. The starter system of claim 1, wherein the at least one bend location further includes a second bend location defining a transition between the second rod segment and an adjacent third rod segment and a third bend location defining a transition between the third rod segment and an adjacent fourth rod segment, and wherein the rod segments are configured to engage the handle tube such that a tightening of the nut member on the threaded portion transmits loading into the first, second and third rod segments.

11. The starter system of claim 10, wherein the loading of the rod segments is dynamic such that the tightening of the nut member causes a deflection of the second and third rod segments.

12. A manual starter system for a lawn mower having an internal combustion engine, the starter system comprising:
a handle tube including opposite first and second openings at a mounting location; and
a rope guide for receipt of a starter rope, the rope guide received through the first and second openings of the handle tube,
wherein the rope guide including a rod member including a plurality of bend locations in a proximal end portion of the rope guide, the bend locations including first, second and third bend locations defining first, second, third and fourth rod segments for the rod member of the rope guide, the bend locations configured to define first and second points of direct contact between the rod member of the rope guide and an outer surface of the handle tube, the first contact point defined on the second rod segment adjacent one of the handle tube openings, the second contact point defined on the third rod segment adjacent the third bend location, a gap being defined between the rod member and the outer tube surface such that the rod member of the rope guide is substantially out of contact with the handle tube between the first and second contact points.

13. The starter system of claim 12, wherein the first rod segment includes a threaded portion for receiving a nut member to secure the rope guide to the handle tube, the proximal end portion of the rope guide being configured such that a tightening of the nut member from a partially-secured condition for the rope guide towards a fully-tightened condition deflects the second and third rod segments such that the gap is increased.

14. The starter system of claim 12, wherein the first rod segment is substantially linear, the second rod segment is curved in substantially circular manner at a diameter approximately equal to a diameter of the outer tube surface, and the third rod segment extends substantially with respect to the handle tube.

15. The starter system of claim 12, wherein the first bend location includes an acute angle between the first and second rod segments.

16. The starter system of claim 12, wherein the fourth rod segment extends from the handle tube to a remotely located coil.

17. The starter system of claim 16, wherein the fourth rod segment extends obliquely with respect to the handle tube.

18. The starter system of claim 12, wherein the handle tube includes an indentation in which one of the openings is located and wherein the first contact point is located adjacent the indentation.

19. A rope guide for use with a lawn mower starter system including a handle tube with opposite openings for receiving a rod member of the rope guide, the rope guide comprising:
a threaded area in a proximal end portion of the rope guide for receiving a nut member for securing the rope guide to the handle tube;
a first bend in the rod member in the proximal end portion defining a transition between a first rod segment including the threaded end and an adjacent second rod segment, the first bend including an acute angle between the first and second rod segments;
a second bend in the rod member in the proximal end portion defining a transition between the second rod segment and an adjacent third rod segment, the second rod segment curving in substantially continuous manner from the first bend to the second bend; and a
a third bend in the rod member in the proximal end portion defining a transition between the third rod segment and an adjacent fourth rod segment, the third rod segment extending substantially longitudinally with respect to the handle tube,
the rod member directly contacting an outer surface of the handle tube at a first contact point located on the second rod segment adjacent one of the handle openings and at a second contact point located on the third rod segment adjacent the third bend, the rope guide being substantially out of contact with the tube outer surface between the first and second contact points to define a gap along the second and third rod segments.

20. The starter system rope guide of claim 19, wherein the proximal end portion of the rope guide is configured such that a tightening of the nut member from a partially-secured condition of the rope guide towards a fully-tightened condition dynamically loads the rod member to deflect the second and third rod segments such that the gap is increased.

* * * * *